United States Patent
Dai et al.

(10) Patent No.: US 11,542,388 B2
(45) Date of Patent: Jan. 3, 2023

(54) PLASTIC FLOORBOARD PROCESSING TECHNOLOGY USING DIGITAL PRINTING

(71) Applicant: Zhejiang Kingdom New Material Group Co., Ltd., Jiaxing (CN)

(72) Inventors: Huibin Dai, Jiaxing (CN); Zhongfei Zhang, Jiaxing (CN); Peidong Zhao, Jiaxing (CN)

(73) Assignee: ZHEJIANG KINGDOM NEW MATERIAL GROUP CO., LTD., Jiaxing (CN)

( * ) Notice: Subject to any disclaimer, the term of this patent is extended or adjusted under 35 U.S.C. 154(b) by 248 days.

(21) Appl. No.: 16/767,108

(22) PCT Filed: Jan. 26, 2018

(86) PCT No.: PCT/CN2018/074297
§ 371 (c)(1),
(2) Date: May 26, 2020

(87) PCT Pub. No.: WO2019/144374
PCT Pub. Date: Aug. 1, 2019

(65) Prior Publication Data
US 2020/0377711 A1 Dec. 3, 2020

(51) Int. Cl.
| | |
|---|---|
| *B29C 48/00* | (2019.01) |
| *C08L 27/06* | (2006.01) |
| *B29C 59/04* | (2006.01) |
| *B29D 7/00* | (2006.01) |
| *B41M 5/00* | (2006.01) |
| *B44C 1/24* | (2006.01) |
| *E04F 15/10* | (2006.01) |
| *B29K 27/06* | (2006.01) |
| *B29K 509/00* | (2006.01) |

(52) U.S. Cl.
CPC ............ *C08L 27/06* (2013.01); *B29C 48/002* (2019.02); *B29C 48/0022* (2019.02); *B29C 59/04* (2013.01); *B29D 7/00* (2013.01); *B41M 5/0064* (2013.01); *B44C 1/24* (2013.01); *E04F 15/105* (2013.01); *B29C 2793/009* (2013.01); *B29K 2027/06* (2013.01); *B29K 2509/14* (2013.01)

(58) Field of Classification Search
CPC ...... C08L 27/06; C08L 91/06; B29C 48/0022; B29C 48/002; B29C 59/04; B29C 67/245; B29C 2793/009; B29D 7/00; B44C 1/24; B44C 5/0438; B44C 5/0453; B41M 5/0064; E04F 15/105; C08K 3/36; B29L 2007/002; B29K 2027/06; B29K 2509/14
See application file for complete search history.

(56) References Cited

U.S. PATENT DOCUMENTS

| | | | |
|---|---|---|---|
| 2017/0183878 A1* | 6/2017 | Zhang | E04F 15/105 |
| 2017/0368760 A1* | 12/2017 | Troendle | B32B 27/08 |
| 2019/0352915 A1* | 11/2019 | Dai | C08J 5/121 |

* cited by examiner

*Primary Examiner* — Monica A Huson
(74) *Attorney, Agent, or Firm* — Muncy, Geissler, Olds & Lowe, P.C.

(57) ABSTRACT

A plastic floor board processing technology using digital printing, aiming to solve the problem relating to the high production cost, comprising the steps of: preparing a base material; blending the base material; extruding the blended base material into a mold to form a stone-plastic base material; adjusting a gap between a surface embossing roll and a bottom embossing roll to enable the stone-plastic base material to pass through the gap; generating embossing patterns and positioning marks at equal intervals on a surface of the stone-plastic base material; cooling the stone-plastic base material; cutting the stone-plastic base material into plastic floorboards; using a digital printer to print the plastic floorboards. According to the present disclosure, patterns are directly printed on the surface of the stone-plastic base material, which avoids the processes of arranging a color film and a wear layer, lowers the production cost and improves the production efficiency.

6 Claims, No Drawings

PLASTIC FLOORBOARD PROCESSING TECHNOLOGY USING DIGITAL PRINTING

TECHNICAL FIELD

This disclosure generally relates to the technical field of floorboards, and more particularly, to a plastic floorboard processing technology using digital printing.

BACKGROUND

With the raise of people's environmental awareness, developing eco-friendly products has become important for floor enterprises. Presently, PVC floorboards have become increasingly popular because of prominent properties that conventional floor decoration materials do not have. The advantages of PVC floor boards, including good decorating performance, effortless installation, convenient maintenance, easy recycling, environmental protection, comfortable foot feeling and high safety, etc., enable them to be widely used in construction projects and become the users' primary choice among floor decoration materials.

To ensure the necessary properties of floor boards, the conventional processing technology of floor boards roughly comprises material preparation, injection molding, shaping and cutting, and to make the floor boards more aesthetically pleasing and durable, patterns resembling wood grains are embossed on the floor board surface by embossing rolls. Moreover, to reveal a color like wood floor board, a color film needs to be customized and laid on the embossed patterns, and a wear layer needs to be arranged after laying the color film, which sharply increase the production cost.

Thus, it is urgent for those skilled in the art to provide a novel method.

SUMMARY

The purpose of the present disclosure is to provide a plastic floorboard processing technology using digital printing, which is capable of lowering the production cost.

To achieve the above purpose, the present disclosure adopts the following technical solution: a method for processing plastic floorboards using digital printing, comprising: preparing a base material, wherein the base material comprises PVC, stone powder, a stabilizer, stearic acid, PE wax and a modifier; blending the base material at a temperature of 120° C. with a speed of 2000 r/min, and blending the base material with a speed of 200 r/min when the temperature falls to 50° C.; extruding the blended base material into a mold through a twin-screw extruder to form a stone-plastic base material; adjusting a gap between a surface embossing roll and a bottom embossing roll to enable the stone-plastic base material to pass through the gap, wherein the surface embossing roll has a first thickness and the bottom embossing roll has a second thickness, wherein a marking block is craved on an edge of the surface embossing roll; generating embossing patterns and positioning marks at equal intervals on a surface of the stone-plastic base material, wherein generating embossing patterns and positioning marks comprises passing the stone-plastic base material through the gap; cooling the stone-plastic base material at a natural temperature between 26° C.-30° C.; selecting a first positioning mark of the positioning marks as a first point and a second positioning mark of the positioning marks as a second point, wherein the second positioning mark is selected according to a required length of the plastic floorboard; cutting the stone-plastic base material into plastic floorboards with the required length, wherein cutting the stone-plastic base material comprises cutting the stone-plastic base material at the second point; using a digital printer to print the plastic floorboards, wherein the digital printer starts printing when the first point is sensed by a sensing device of the digital printer, and stops printing when the second point is sensed; shower-coating a UV primer paint and a UV finish paint on the plastic floorboards; reconditioning the plastic floorboards; and slotting the plastic floorboards.

According to the aforesaid technical solution, during production, PVC, stone powder, a stabilizer, stearic acid, PE wax and a modifier are selected as the base material, and are then fed into a blender for being blended evenly. Subsequently, the blended base material is fed into a twin-screw extruder, and is extruded into a mold prepared in advance by the twin-screw extruder, thereby forming a board-like stone-plastic base material therein. Subsequently, the spacing between the surface embossing roll and the bottom embossing roll is adjusted according to the actual needs, and the stone-plastic base material passes through the gap between the surface embossing roll and the bottom embossing roll. Thus, the thickness of the stone-plastic base material is determined. As the edge of the embossing roll is carved with a marking block, when the stone-plastic base material passes through the embossing roll, the marking block leaves marks on the edge of the stone-plastic base material as positioning points in the meantime. The marking block is carved at the starting end of the pattern on the surface of the embossing roll, which allows the positioning marks to be easily sensed and more aesthetically pleasing. After passing through the embossing roll, the surface of the stone-plastic base material is pressed with needed patterns. When cutting, a first positioning mark is taken as the first point, and a second point is selected for cutting according to the required length of the floorboard. In this way, both ends of each floorboard are provided with positioning points. During the subsequent printing process, patterns corresponding to the embossed patterns on the stone-plastic base material are stored in a digital printer. Once a positioning mark is sensed by the sensing device of the digital printer, an immediate feedback to the digital printer is required, which enables the digital printer to achieve an accurate spray-printing. The aforesaid allows the printed patterns to match the embossed patterns on the surface of the stone-plastic base material more accurately, thus making the embossed patterns clearer. Through adopting the aforesaid technical solution, during production, clear and vivid patterns may be formed on the surface of the stone-plastic base material without arranging a color film and a wear layer on the surface of the stone-plastic base material. Thus, the cost of customizing and purchasing the color film is saved, the forming process of a wear layer is avoided, and the production efficiency is improved.

In another aspect of the present disclosure, generating embossing patterns and positioning marks comprises introducing heat conduction oil into the surface embossing roll to heat the surface embossing roll to a temperature between 180-190° C.

Through adopting the aforesaid technical solution, the heat conduction oil heats the surface embossing roll during the embossing process, which makes the embossing easier and the embossed patterns clearer.

In another aspect of the present disclosure, using a digital printer to print the plastic floorboards includes preparing patterns to be digitally printed according to the embossing patterns, and pray-printing the patterns on surfaces of plastic floorboards.

Through adopting the aforesaid technical solution, decorative patterns same as the embossed patterns on the stone-plastic base material are pre-stored in a digital printer. When using a digital printer to spray-print decorative patterns on the stone-plastic base material, the printed patterns accurately match the embossed patterns on the surface of the stone-plastic base material, thus making the embossed patterns more vivid.

In another aspect of the present disclosure, the marking block is carved at a starting end of the pattern on the surface embossing roll.

Through adopting the aforesaid technical solution, the marking block is carved at the starting end of the pattern on the surface of the embossing roll, which allows the positioning marks to be easily sensed and more aesthetically pleasing.

In another aspect of the present disclosure, the method for processing plastic floorboards using digital printing further includes forming jointing slots in side edges of the plastic floorboards.

Through adopting the aforesaid technical solution, the jointing slots formed in the side edges of the floorboards enable the floorboards to be conveniently jointed in the later period.

In another aspect of the present disclosure, shower-coating a UV primer paint and a UV finish paint on the plastic floorboards includes placing the floorboards in an environment having 50% humidity.

Through adopting the aforesaid technical solution, the floorboards are placed in an environment having 50% humidity for reconditioning, which prevents the floorboards from bending or warping after prolonged use.

Compared with the prior art, the present disclosure has the following advantages:

During production, PVC, stone powder, a stabilizer, stearic acid, PE wax and a modifier are selected first, and are then fed into a blender for being blended evenly. Subsequently, the blended materials are fed into a twin-screw extruder, and are extruded into a mold prepared in advance by the twin-screw extruder, thereby forming a board-like base material therein. Subsequently, the spacing between the first thickness-determining roll and the second thickness-determining roll is adjusted according to the actual needs, and the base material passes through the gap between the first thickness-determining roll and the second thickness-determining roll. Thus, the thickness of the base material is determined. As the edge of the embossing roll is carved with a marking block, when the base material passes through the embossing roll, the marking block leaves marks on the edge of the base material as positioning points in the meantime. The marking block is carved at the starting end of the pattern on the surface of the embossing roll, which allows the positioning marks to be easily sensed and more aesthetically pleasing. After passing through the embossing roll, the surface of the stone-plastic base material is pressed with needed patterns. When cutting, a first positioning mark is taken as the first point, and a second point is selected for cutting according to the required length of the floorboard. In this way, both ends of each floorboard are provided with positioning points. During the subsequent printing process, patterns corresponding to the embossed patterns on the base material are stored in a digital printer. Once a positioning mark is sensed by the sensing device of the digital printer, an immediate feedback to the digital printer is required, which enables the digital printer to achieve an accurate spray-printing. The aforesaid allows the printed patterns to match the embossed patterns on the surface of the stone-plastic base material more accurately, thus making the embossed patterns clearer. Through adopting the aforesaid technical solution, during production, clear and vivid patterns may be formed on the surface of the stone-plastic base material without arranging a color film and a wear layer on the surface of the stone-plastic base material. Thus, the cost of customizing and purchasing the color film is saved, the forming process of a wear layer is avoided, and the production efficiency is improved.

DETAILED DESCRIPTION

Detailed embodiments are combined hereinafter to further elaborate the technical solution of the present disclosure.

Embodiment 1

A plastic floorboard processing technology using digital printing, comprising the steps of:

Step A: preparing raw materials of a base material: selecting PVC, stone powder, a stabilizer, stearic acid, PE wax and a modifier, and fully mixing the above raw materials;

Step B: blending: blending at a temperature of 120° C. with a speed of 2000 r/min, and when the temperature falls to 50° C., blending with a speed of 200 r/min;

Step C: extrusion molding: extruding the blended raw materials into a mold through a twin-screw extruder, thereby forming a stone-plastic base material;

Step D: shaping: adjusting the spacing between a first thickness-determining roll and a second thickness-determining roll, and enabling the stone-plastic base material to pass through the gap between a surface embossing roll (the first thickness-determining roll) and a bottom embossing roll (the second thickness-determining roll);

Step E: embossing: arranging the surface embossing roll and the bottom embossing roll up and down, carving a marking block on the edge of the surface embossing roll, wherein the marking block is carved at the starting end of the pattern on the surface embossing roll; introducing heat conduction oil into the surface embossing roll, thereby heating the surface embossing roll to a temperature of 180-190° C.; subsequently, enabling the stone-plastic base material to pass through the gap between the surface embossing roll and the bottom embossing roll, thereby circularly and repeatedly embossing patterns on the surface of the stone-plastic base material while forming positioning marks at equal intervals;

Step F: cooling: cooling the stone-plastic base material with embossed patterns at a natural temperature of 26° C.-30° C.;

Step G: cutting: selecting a positioning mark as a first point, selecting another positioning mark as a second point according to the required length of the floor board, and cutting at the second point; finally, cutting the stone-plastic base material into a plurality of segments with equal length;

Step H: digital printing: preparing patterns to be digitally printed, making the patterns to correspond to the embossed patterns formed on the stone-plastic base material in step E; subsequently, spray-printing the patterns on the surfaces of the floor boards by a digital printer, wherein the digital printer starts printing when the first point of each floor board is sensed by a sensing device of the digital printer, and stops printing when the second point is sensed;

Step I: shower-coating: sequentially shower-coating a UV primer paint and a UV finish paint on the printed floorboards;

Step J: reconditioning: placing the floorboards in an environment having 50% humidity;

Step K: slotting: forming jointing slots in the side edges of the floorboards.

During production, PVC, stone powder, a stabilizer, stearic acid, PE wax and a modifier are selected first, and are then fed into a blender for being blended evenly. Subsequently, the blended materials are fed into a twin-screw extruder, and are extruded into a mold prepared in advance by the twin-screw extruder, thereby forming a board-like base material therein. Subsequently, the spacing between the first thickness-determining roll and the second thickness-determining roll is adjusted according to the actual needs, and the base material passes through the gap between the first thickness-determining roll and the second thickness-determining roll. Thus, the thickness of the base material is determined.

As the edge of the surface embossing roll is carved with a marking block, when the base material passes through the surface embossing roll, the marking block leaves marks on the edge of the base material as positioning points in the meantime. The marking block is carved at the starting end of the pattern on the surface of the surface embossing roll, which allows the positioning marks to be easily sensed and more aesthetically pleasing. After passing through the surface embossing roll, the surface of the stone-plastic base material is pressed with needed patterns. When cutting, a first positioning mark is taken as the first point, and a second point is selected for cutting according to the required length of the floorboard. In this way, both ends of each floorboard are provided with positioning points.

During the subsequent printing process, patterns corresponding to the embossed patterns on the base material are stored in a digital printer. Once a positioning mark is sensed by the sensing device of the digital printer, an immediate feedback to the digital printer is required, which enables the digital printer to achieve an accurate spray-printing. The aforesaid allows the printed patterns to match the embossed patterns on the surface of the stone-plastic base material more accurately, thus making the embossed patterns clearer. Through adopting the aforesaid technical solution, during production, clear and vivid patterns may be formed on the surface of the stone-plastic base material even without arranging a color film and a wear layer on the surface of the stone-plastic base material. Thus, the cost of customizing and purchasing the color film is saved, the forming process of a wear layer is avoided, and the production efficiency is improved.

Additionally, in step B, the purpose of high-speed heating and blending is to evenly blend all raw materials, and the purpose of low-speed cooling and blending is to keep the raw materials in a stable state after the blending and before the production. Thus, the stability of quality is ensured.

Embodiment 2

What makes embodiment 2 different from embodiment 1 is, the plastic floorboard processing technology using digital printing in embodiment 2, comprising the steps of:

Step A: preparing raw materials of a base material: selecting PVC, stone powder, a stabilizer, stearic acid, PE wax and a modifier, and fully mixing the above raw materials;

Step B: blending: blending at a temperature of 120° C. with a speed of 2000 r/min, and when the temperature falls to 50° C., blending with a speed of 200 r/min;

Step C: extrusion molding: extruding the blended raw materials into a mold through a twin-screw extruder, thereby forming a stone-plastic base material;

Step D: shaping: adjusting the spacing between a first thickness-determining roll and a second thickness-determining roll, and enabling the stone-plastic base material to pass through the gap between a surface embossing roll and a bottom embossing roll;

Step E: embossing: arranging the surface embossing roll and the bottom embossing roll up and down, carving a marking block on the edge of the surface embossing roll, wherein the marking block is carved at the starting end of the pattern on the surface embossing roll; introducing heat conduction oil into the surface embossing roll, thereby heating the surface embossing roll to a temperature of 180-190° C.; subsequently, enabling the stone-plastic base material to pass through the gap between the surface embossing roll and the bottom embossing roll, thereby circularly and repeatedly embossing patterns on the surface of the stone-plastic base material, and forming positioning marks at equal intervals;

Step F: cooling: cooling the stone-plastic base material with embossed patterns at a natural temperature of 26° C.-30° C.;

Step G: cutting: selecting a positioning mark as a first point, selecting another positioning mark as a second point according to the required length of the floor board, and cutting at the second point; finally, cutting the stone-plastic base material into a plurality of segments with equal length;

Step J: reconditioning: placing the floorboards in an environment having 50% humidity;

Step K: slotting: forming jointing slots in the side edges of the floorboards;

Step H: digital printing: preparing patterns to be digitally printed, making the patterns to correspond to the embossed patterns formed on the stone-plastic base material in step E; subsequently, spray-printing the patterns on the surfaces of the floor boards by a digital printer, wherein the digital printer starts printing when the first point of each floor board is sensed by a sensing device of the digital printer, and stops printing when the second point is sensed;

Step I: shower-coating: sequentially shower-coating a UV primer paint and a UV finish paint on the printed floorboards.

In this embodiment, steps including reconditioning and slotting are performed before the digital printing and shower-coating. According to this arrangement, a long-term shaping of the floorboards is achieved, avoiding the patterns on the floorboards from deforming in the later period. As the errors of patterns are significantly reduced, the patterns on the floorboards remain highly consistent with the original ones.

The above are merely preferred embodiments of the present disclosure, and the scope of the present disclosure is not limited to the embodiments described above. All technical solutions obtained under the idea of the present disclosure shall fall into the scope of the present disclosure. It should be noted that various improvements and modifications may be made by those skilled in the art without departing from the principles of the present disclosure. Therefore, these improvements and modifications shall also fall into the scope of the present disclosure.

What is claimed is:

1. A method for processing plastic floorboards using digital printing, comprising:

preparing a base material, wherein the base material comprises PVC, stone powder, a stabilizer, stearic acid, PE wax and a modifier;

blending the base material at a temperature of 120° C. at a speed of 2000 r/min, and blending the base material at a speed of 200 r/min when the temperature falls to 50° C.;

extruding the blended base material into a mold through a twin-screw extruder to form a stone-plastic base material;

adjusting a gap between a surface embossing roll and a bottom embossing roll to enable the stone-plastic base material to pass through the gap, wherein the surface embossing roll has a first thickness and the bottom embossing roll has a second thickness, wherein a marking block is carved on an edge of the surface embossing roll;

generating embossing patterns and positioning marks at equal intervals on a surface of the stone-plastic base material, wherein generating embossing patterns and positioning marks comprises passing the stone-plastic base material through the gap;

cooling the stone-plastic base material at a natural temperature between 26° C.-30° C.;

selecting a first positioning mark of the positioning marks as a first point and a second positioning mark of the positioning marks as a second point, wherein the second positioning mark is selected according to a required length of the plastic floorboard;

cutting the stone-plastic base material into plastic floorboards with the required length, wherein cutting the stone-plastic base material comprises cutting the stone-plastic base material at the second point;

using a digital printer to print the plastic floorboards, wherein the digital printer starts printing when the first point is sensed by a sensing device of the digital printer, and stops printing when the second point is sensed;

shower-coating a UV primer paint and a UV finish paint on the plastic floorboards;

reconditioning the plastic floorboards; and slotting the plastic floorboards.

2. The method for processing plastic floorboards using digital printing of claim 1, wherein generating embossing patterns and positioning marks comprises introducing heat conduction oil into the surface embossing roll to heat the surface embossing roll to a temperature between 180-190° C.

3. The method for processing plastic floorboards using digital printing of claim 1, wherein using the digital printer to print the plastic floorboards comprises preparing patterns to be digitally printed according to the embossing patterns, and spray-printing the patterns on surfaces of plastic floorboards.

4. The method for processing plastic floorboards using digital printing of claim 3, wherein the marking block is carved at a starting end of the embossing patterns on the surface embossing roll.

5. The method for processing plastic floorboards using digital printing of claim 1, further comprises forming jointing slots in side edges of the plastic floorboards.

6. The method for processing plastic floorboards using digital printing of claim 1, wherein shower-coating a UV primer paint and a UV finish paint on the plastic floorboards comprises placing the floorboards in an environment having 50% humidity.

* * * * *